United States Patent
Liu et al.

(10) Patent No.: US 12,260,445 B2
(45) Date of Patent: Mar. 25, 2025

(54) INFORMATION DISPLAY METHOD AND APPARATUS, ELECTRONIC DEVICE, AND STORAGE MEDIUM

(71) Applicant: Beijing Zitiao Network Technology Co., Ltd., Beijing (CN)

(72) Inventors: Yan Liu, Beijing (CN); Wanqi Li, Beijing (CN); Yaqi Li, Beijing (CN); Shidan Gui, Beijing (CN); Yiqiang Wu, Beijing (CN); Lan Feng, Beijing (CN); Yingsha Gao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/652,160

(22) Filed: May 1, 2024

(65) Prior Publication Data

US 2024/0303716 A1      Sep. 12, 2024

Related U.S. Application Data

(63) Continuation of application No. PCT/CN2022/128873, filed on Nov. 1, 2022.

(30) Foreign Application Priority Data

Nov. 2, 2021   (CN) .......................... 202111290780.4

(51) Int. Cl.
*G06Q 30/00*   (2023.01)
*G06Q 30/0601*   (2023.01)

(52) U.S. Cl.
CPC ................................ *G06Q 30/0631* (2013.01)

(58) Field of Classification Search
CPC ............................................... G06Q 30/06–08
See application file for complete search history.

(56) References Cited

U.S. PATENT DOCUMENTS

| | | | | |
|---|---|---|---|---|
| 10,846,779 | B2 * | 11/2020 | Johnson | A63F 13/792 |
| 11,645,663 | B2 * | 5/2023 | Justin | G06Q 30/0631 |
| | | | | 705/7.29 |
| 2019/0394498 | A1 * | 12/2019 | Lo | H04N 21/6405 |
| 2020/0005367 | A1 | 1/2020 | Christian-Ezeofor et al. | |

FOREIGN PATENT DOCUMENTS

| | | | | |
|---|---|---|---|---|
| CN | 109672939 A | | 4/2019 | |
| CN | 111918075 A | * | 11/2020 | ......... G06F 16/9535 |
| CN | 112104899 A | | 12/2020 | |

(Continued)

OTHER PUBLICATIONS

Machine translation of CN111918075A downloaded from Espacenet.com (Year: 2020).*

(Continued)

*Primary Examiner* — Ethan D Civan
(74) *Attorney, Agent, or Firm* — Alleman Hall & Tuttle LLP (57) ABSTRACT

Embodiments of the present disclosure disclose an information display method and apparatus, an electronic device, and a storage medium. The information display method includes: displaying a live page; obtaining popularity information corresponding to the resource; and displaying the popularity information in an area which is associated with the first multimedia information on the live page.

18 Claims, 7 Drawing Sheets displaying a live page, wherein the live page comprises first multimedia information corresponding to a resource being recommended in a live channel — S101 obtaining popularity information corresponding to the resource — S102 displaying the popularity information in an area which is associated with the first multimedia information on the live page — S103

(56) References Cited

FOREIGN PATENT DOCUMENTS

| CN | 112330350 A | 2/2021 |
|---|---|---|
| CN | 112347273 A | 2/2021 |
| CN | 112399200 A | 2/2021 |
| CN | 113393290 A | 9/2021 |
| CN | 113506154 A | 10/2021 |
| CN | 113515686 A | 10/2021 |
| CN | 113935813 A | 1/2022 |

OTHER PUBLICATIONS

"Live Streaming: a New Way to Boost Sales Amid Pandemic", People's Daily (Beijing), Apr. 23, 2020 (Year: 2020).*
China National Intellectual Property Administration, Office Action and Search Report Issued in Application No. 202111290780.4, Nov. 23, 2023, 22 pages.
China National Intellectual Property Administration, Office Action and Search Report Issued in Application No. 202111290780.4, Feb. 29, 2024, 17 pages.
ISA China National Intellectual Property Administration, International Search Report Issued in Application No. PCT/CN2022/128873, Jan. 28, 2023, WIPO, 6 pages.
ISA China National Intellectual Property Administration Written Opinion of the International Searching Authority Issued in Application No. PCT/CN2022/128873, Jan. 28, 2023, WIPO, 7 pages.
European Patent Office, Extended European Search Report Issued in Application No. 22889250.1, Sep. 2, 2024, 10 pages.

\* cited by examiner

INFORMATION DISPLAY METHOD AND APPARATUS, ELECTRONIC DEVICE, AND STORAGE MEDIUM

CROSS-REFERENCE TO RELATED APPLICATIONS

The present disclosure is a Continuation application of International Patent Application No. PCT/CN2022/128873, filed on Nov. 1, 2022, which is based on and claims the priority to the Chinese Patent Application No. 202111290780.4 filed on Nov. 2, 2021, the disclosure of both of which are incorporated by reference herein in their entirety.

TECHNICAL FIELD

The present disclosure relates to the field of information technology, and in particular, to an information display method and apparatus, an electronic device, and a storage medium.

BACKGROUND

With the continuous development of information technology, people can communicate and interact through various social platforms. For example, a user can purchase a resource in a live channel, the resource can be an entity or virtual one, and the resource can be displayed to the user in a form of an recommendation card, but the user cannot directly know a transfer volume of the resource only through the recommendation card, so that user experience is poor.

SUMMARY

In order to solve the above technical problem or at least partially solve the technical problem, embodiments of the present disclosure provide an information display method and apparatus, an electronic device, and a storage medium, so that a user can directly view popularity information corresponding to a resource in a live channel.

Some embodiments of the present disclosure provide an information display method, comprising:
  displaying a live page, wherein the live page comprises first multimedia information corresponding to a resource being recommended;
  obtaining popularity information corresponding to the resource; and
  displaying the popularity information in an area which is associated with the first multimedia information on the live page.

Some embodiments of the present disclosure provide another information display method, which is applicable to a live channel, wherein the live channel comprises a resource being recommended, the method comprising:
  determining popularity information corresponding to a resource being recommended in a live channel, wherein the popularity information corresponding to the resource is determined according to a transfer volume and a promotion time of the resource in the live channel; and
  sending the popularity information to a client to display the popularity information in an area which is associated with first multimedia information on a live page displayed by the client, wherein the first multimedia information corresponds to the resource.

Some embodiments of the present disclosure further provide an information display apparatus, comprising:
  a first display unit configured to display a live page, the live page comprising first multimedia information which corresponds to the resource;
  an obtaining unit configured to obtain popularity information corresponding to the resource; and
  a second display unit configured to display the popularity information in an area which is associated with the first multimedia information on the live page.

Some embodiments of the present disclosure further provide another information display apparatus, comprising:
  a determining unit configured to determine popularity information corresponding to the resource being recommended in a live channel;
  a sending unit configured to send the popularity information to a client to display the popularity information in an area which is associated with first multimedia information on a live page displayed by the client, wherein the first multimedia information corresponds to the resource.

Some embodiments of the present disclosure further provide an electronic device, comprising:
  one or more processors; and
  storage means configured to one or more programs,
  the one or more programs, when executed by the one or more processors, causing the one or more processors to implement the information display method as described above.

Some embodiments of the present disclosure further provide a computer-readable storage medium having thereon stored a computer program which, when executed by a processor, implements the information display method as described above.

Some embodiments of the present disclosure further provide a computer program product, comprising a computer program or instructions which, when executed by a processor, implement the information display method as described above.

BRIEF DESCRIPTION OF THE DRAWINGS

The above and other features, advantages, and aspects of the embodiments of the present disclosure will become more apparent in conjunction with the accompanying drawings and with reference to the following DETAILED DESCRIPTION. Throughout the drawings, the same or similar reference numbers denote the same or similar elements. It should be understood that the drawings are schematic and that components and elements are not necessarily drawn to scale.

DETAILED DESCRIPTION

The embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, which, however, are provided for a more complete and thorough understanding of the present disclosure instead. It should be understood that the drawings and the embodiments of the present disclosure are for exemplary purposes only and are not intended to limit the scope of protection of the present disclosure.

It should be understood that various steps recited in method implementations of the present disclosure can be performed in a different order, and/or performed in parallel. Furthermore, the method implementations can include additional steps and/or omit the illustrated steps. The scope of the present disclosure is not limited in this respect.

The term "include" and variations thereof used herein are intended to be open-minded, i.e., "comprising but not limited to". The term "based on" is "at least partially based on". The term "one embodiment" means "at least one embodiment"; the term "another embodiment" means "at least one other embodiment"; and the term "some embodiments" means "at least some embodiments". Definitions related to other terms will be given in the following description.

It should be noted that the terms "first", "second", and the like mentioned in the present disclosure are only used for distinguishing different devices, modules or units, and are not used for limiting the order or interdependence of functions performed by the devices, modules or units.

It should be noted that modifications of "a" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in some embodiments of the present disclosure are for illustrative purposes only, and are not intended to limit the scope of the messages or information.

Figure 1:
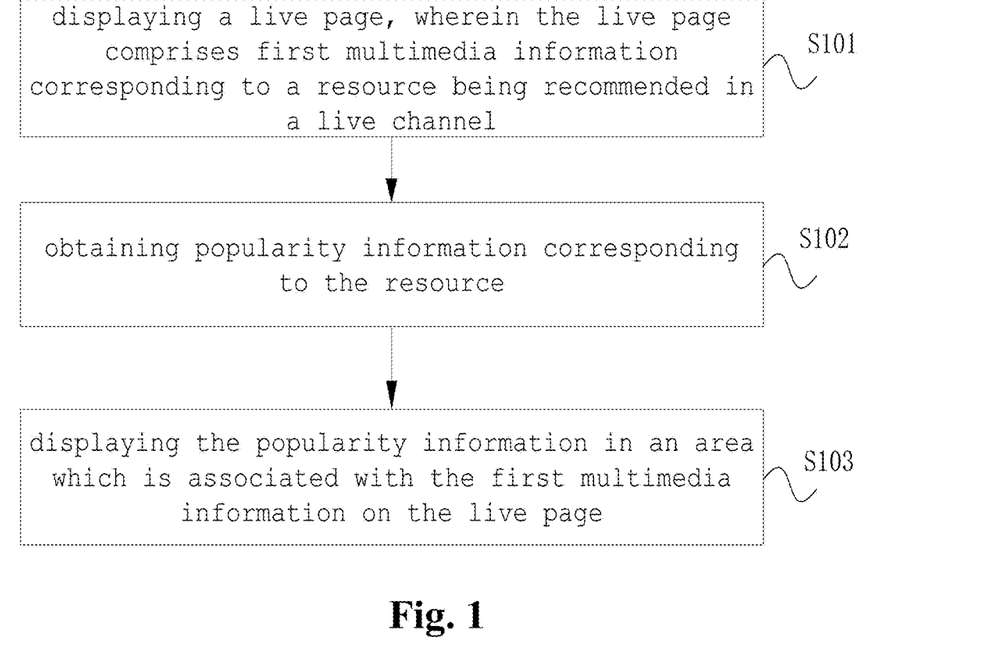
FIG. 1 is a flow diagram of an information display method in some embodiments of the present disclosure.

FIG. 1 is a flow diagram of an information display method in some embodiments of the present disclosure; the embodiments are applicable to a case of information display in a client; the method can be performed by an information display apparatus, and the apparatus can be implemented in a manner of software and/or hardware, and the apparatus can be configured in an electronic device, for example, a terminal, specifically comprising but not limited to a smartphone, a personal digital assistant, a tablet computer, a wearable device with a display screen, a desktop computer, a notebook computer, an all-in-one computer, a smart home device, and the like.

As shown in FIG. 1, the method includes the following steps S101 to S103.

S101, display a live page, wherein the live page comprises first multimedia information corresponding to a resource being recommended in a live channel (also referred to a live room). The live channel is a channel, through which users can display live content, watch live content, perform live interaction and so on.

It can be understood that the method described in FIG. 1 can be performed by a client, and the client can specifically be the above terminal 21, the terminal 21 has a live page displayed thereon, the live page can be understood as a live page, and the live page comprises the first multimedia information which corresponds to the resource, the resource can specifically refer to a commodity sold in a live channel, which can be an entity or virtual one; in the following embodiments, description is made by taking an example that the resource is a commodity, and the first multimedia information can be basic information of the commodity and can be displayed on the live page in a form of an recommendation card (also referred to a pin card).

Figure 2:
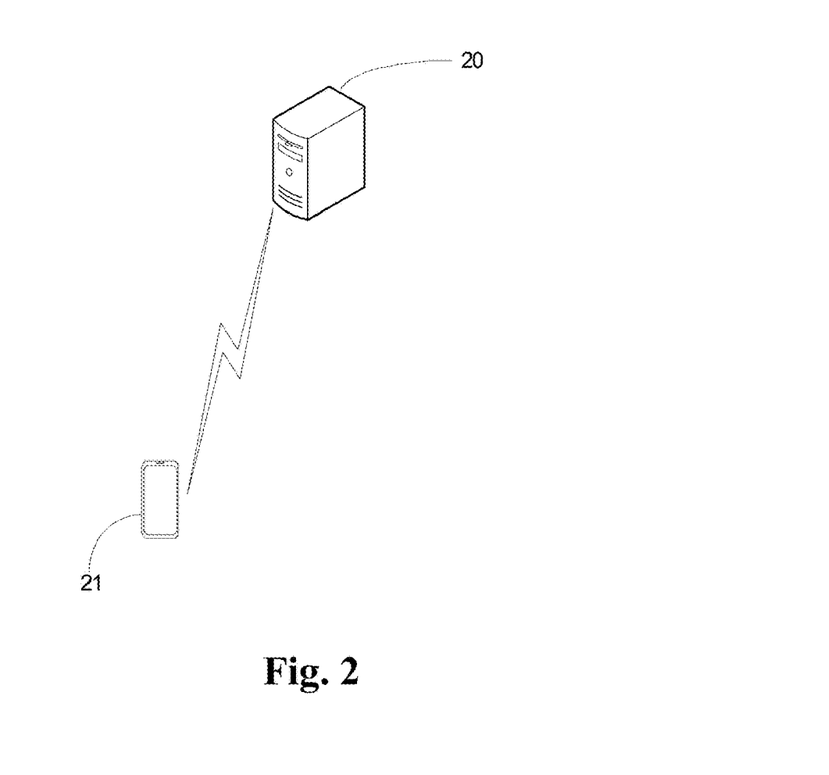
FIG. 2 is a schematic diagram of an application scenario in some embodiments of the present disclosure.

As shown in FIG. 2, the terminal 21 communicates with a server 20. In a possible implementation, the terminal 21 can have an application (APP) installed respectively, and the server 20 can be a server corresponding to the APP. That is, the server 20 can provide an application service to a user of the terminal through this APP. It can be understood that the application scenario shown in FIG. 2 is only a schematic description and does not make specific limitations. In addition, some embodiments do not specifically limit the APP, for example, the APP can be an APP having a communication function, and can support live view, so that the user corresponding to the terminal 21 can communicate with the server 20 through the APP.

Figure 3:
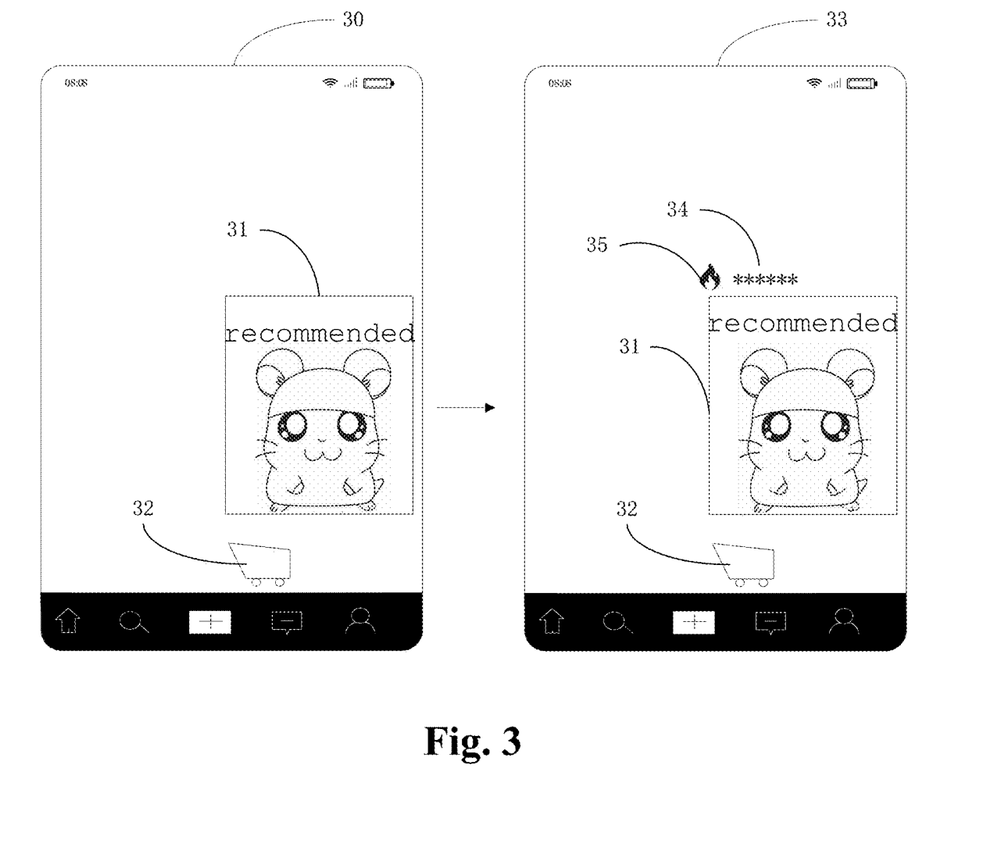
FIG. 3 is a schematic diagram of a user page in some embodiments of the present disclosure.
Figure 4:
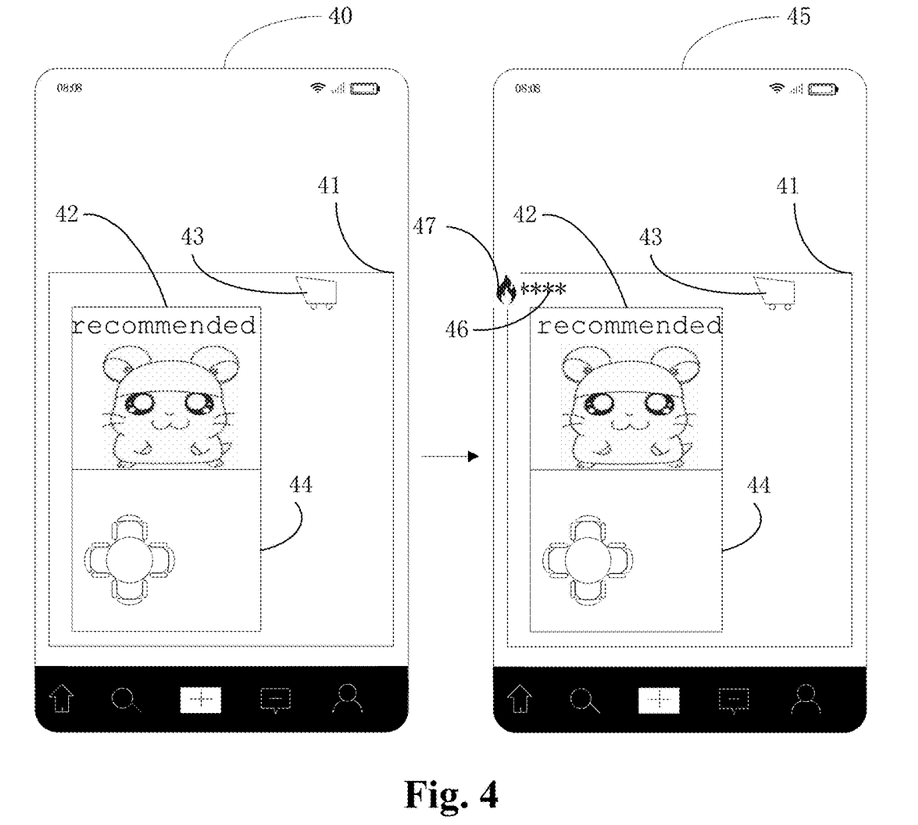
FIG. 4 is a schematic diagram of another user page in some embodiments of the present disclosure.

In some embodiments, a schematic description is made by taking a user page of the terminal 21 as an example, for example, a user page shown in FIG. 3 is a schematic diagram of the user page of the terminal 21. As shown in FIG. 3, a user page 30 can be denoted as the live page, and the live page 30 can be the live page of the APP as described above, and the live page can be a page capable of playing a multi-card aggregation feed flow after the APP is started. As shown in FIG. 3, the live page 30 comprises a commodity recommendation card 31 and a shopping cart identification 32, wherein the recommendation card 31 is a card popping up in the live channel when an anchor recommends the commodity, and the recommendation card 31 comprises basic information of the commodity, that is, the recommendation card 31 comprises the first multimedia information of the commodity, and the first multimedia information refers to an introduction related to the commodity. It can be understood that the multimedia information is not limited to image information and video information, and can also include, for example, text information, audio information, or combination information of at least two of the text information, the audio information, the image information, and the video information. After the shopping cart identification 32 is triggered, a commodity list of all commodities in the live channel can be displayed; as shown in FIG. 4, a user page 40 can also be denoted as a live page, the user page 40 is displayed after the shopping cart identification 32 is triggered on the basis of the user page 30, and the user page 40 comprises a commodity list 41, multimedia information 42 of a commodity being recommended, displayed in the commodity list, a shopping cart identification 43, and multimedia information 44 of other commodities. It can be understood that, the multimedia information 31 and the multimedia information 42 corresponding to the commodity in the user page 30 and the user page 40 can be the same or different, and the multimedia information can be set by the anchor himself.

In some embodiments, a trigger operation can not be limited to click, double click, swipe, long press, voice control, gesture control, expression control, and the like. A display component can specifically include a display screen, a touch screen, and other components or modules having a display function.

S102, obtain popularity information corresponding to the resource.

In some embodiments, the popularity information comprises a popularity identification and a transfer volume of the resource.

Understandably, on the basis of the above S101, the terminal 21 can obtain the popularity information corresponding to the resource from the server 20, according to the resource involved in the first multimedia information. In case that the resource is a commodity, the popularity information can be understood as hot sale information, i.e., sale information of the commodity, the popularity identification can be understood as a hot sale identification, and the transfer volume of the resource can be understood as a sales volume of the commodity. Specifically, the terminal 21 can obtain the hot sale information corresponding to the commodity from the server 20 according to the commodity involved in the multimedia information. The hot sale information of the commodity to be obtained can be in one of the following three cases: specifically, in a first case, when the user of the terminal 21 enters the live channel, he views the recommendation card 31 of the commodity being recommended, and then obtains the hot sale information corresponding to the commodity; in a second case, when the user views a live in the live channel, the anchor switches the recommended commodity, the recommendation card 31 will be correspondingly switched, that is, the multimedia information of the recommendation card 31 is switched, and at this time, the hot sale information corresponding to the commodity also needs to be obtained; and in a third case, when the user views a live, he opens the shopping cart identification 32 and views the multimedia information 44 of the commodity being recommended in the commodity list 41, then he will also obtain the hot sale information corresponding to the commodity. In the above three cases, the terminal 21 will obtain the hot sale information of the commodity being recommended, wherein the hot sale information comprises the hot sale identification and an accumulated sales volume of the commodity in the live channel; in case that the commodity does not appear in the live channel for the first time, the hot sale information of the commodity can be preset, that is, in case that the commodity was sold in the live channel before, the accumulated sales volume of the commodity before this sale can be stored as the sales volume in the hot sale information; and in case that the commodity is sold in the live channel for the first time, the hot sale information is generated according to a real-time sales volume of the commodity.

It can be understood that, the hot sale identification in some embodiments can indicate a hot sale condition of the commodity, for example, by means of the hot sale identification, it is indicated that the sales volume of the commodity is greater than a preset sales volume or a sales volume rank of the commodity is higher than a preset sales volume rank, and the like, and the hot sale identification can be a flame identification, as shown by, for example, an identification 35 on a live page 33 in FIG. 3 and an identification 47 on a live page 45 in FIG. 4, to identify that the commodity being recommended is in a hot sale state; the identification is merely illustrative and does not make specific limitations, and in other embodiments, there can be other shapes or settings as long as they can identify that the commodity being recommended is in the hot sale state.

S103, display the popularity information in an area which is associated with the first multimedia information on the live page.

Understandably, on the basis of the above S102, in case that the hot sale information (popularity information) of the commodity (resource) being recommended is obtained, the hot sale information is displayed in the area on the live page which is associated with the first multimedia information. For example, in the user page 30, in case that the hot sale information of the commodity involved in the recommendation card 31 is obtained, it is indicated that the commodity is a hot sale commodity, so that the hot sale identification and the accumulated sales volume in the hot sale information are displayed on the live page, for example, the user page 33; the user page 33 is a page displayed after the hot sale information of the commodity is obtained, and the user page 33 is, on the basis of the user page 30, added with the hot sale information 34 and the hot sale identification 35, for identifying that the commodity being recommended belongs to a hot sale commodity in the live channel, which can also facilitate the user to intuitively know the sales volume information of the commodity. It can be understood that, the area which is associated with the first multimedia information can be specifically a periphery of a display area of the first multimedia information, and can be within a range of a preset area outside the display area of the first multimedia information. The hot sale information can be displayed within the range of the preset area outside the display area of the first multimedia information, such as above the first multimedia information 31 or below the first multimedia information 31, the specific display position of the hot sale information on the user page being not limited.

In some embodiments, the live page further comprises a second identification.

Understandably, the second identification can be understood as the shopping cart identification 32 described above.

In some embodiments, after displaying the live page, the method further comprises: in response to detecting a trigger operation for the second identification, displaying a resource list which is associated with the live channel, second multimedia information which corresponds to the resource at the top of the resource list, and the popularity information in an area which is associated with the second multimedia information.

It can be understood that, taking FIG. 3 as an example, in response to detecting that the user triggers the shopping cart identification 32 (second identification) on the user page 30, the terminal 21 displays the resource list which is associated with the live channel; the resource list can be understood as the commodity list in the live channel, that is, it displays the user page 40 in FIG. 4; the resource list is shown as the commodity list 41, the commodity list 41 comprises the second multimedia information 42 of the commodity, the second multimedia information 42 can be displayed at the top in the commodity list 41, and the second multimedia information 42 can be information related to the commodity that is preset by the anchor, wherein contents of the second multimedia information 42 and the first multimedia information 31 can be the same or different.

Understandably, a page after the hot sale information is displayed on the user page 40 is shown as the user page 45, and after the user opens the commodity list 41 through the shopping cart identification 32, the hot sale information of the commodity can be displayed in the area which is associated with the second multimedia information 42 in the commodity list 41, and the area which is associated with the second multimedia information 42 can also be a periphery of a display area of the second multimedia information 42, and can also be within a preset area outside the display area, for example, at an upper left of the second multimedia information 42 on the user page 45, the hot sale identification 47 and sales volume information 46 are displayed.

In some embodiments, the live page further comprises a first identification.

Understandably, the live page comprises an recommendation card, the recommendation card comprises a purchase identification, the first identification refers to the purchase identification, and the purchase identification is used for purchasing the commodity in the recommendation card in the live channel by the user of the terminal 21.

In some embodiments, after displaying the popularity information on the live page, the method further comprises: in response to detecting a trigger operation for the first identification, generating trigger information according to the trigger operation; sending the trigger information to a server so that the server updates the popularity information according to the trigger information; and receiving updated popularity information sent from the server, and displaying the updated popularity information.

Understandably, after the hot sale information of the commodity is displayed on the live page, in response to detecting the trigger operation for the first identification, that is, in response to detecting the trigger operation for the purchase identification, the terminal 21 generates the trigger information according to the trigger operation, the trigger information indicating that a user has purchased the commodity, and sends the trigger information to the server 20 connected with the terminal 21; the server 20 receives the trigger information of the commodity, and can generate an ordering message of the commodity according to the trigger information, the ordering message referring to an ordering message generated according to the purchase information when the user has purchased the commodity, then updates the sales volume of the commodity in the hot sale information of the commodity according to the ordering message, updates the hot sale information corresponding to the commodity according to the updated accumulated sales volume, and sends the updated hot sale information to the terminal 21; and then the terminal 21 receives the updated hot sale information, and displays the updated hot sale information on the live page.

Figure 5:
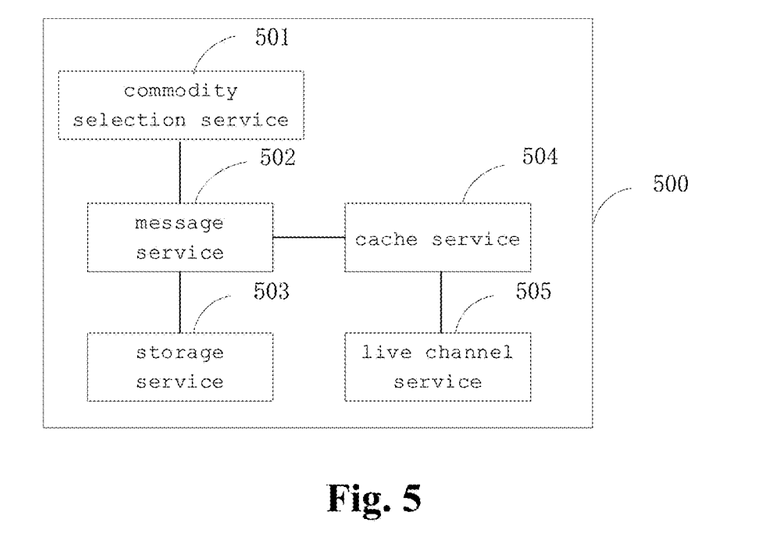
FIG. 5 is a schematic structural diagram of an information display method in some embodiments of the present disclosure.

Understandably, reference is made to FIG. 5, which is a schematic structural diagram of an information display method provided in some embodiments of the present disclosure; 500 comprises a commodity selection service 501, a message service 502, a storage service 503, a cache service 504, and a live channel service 505, wherein the commodity selection service 501 can be understood as a service for an anchor to select a commodity for sale in the live channel, the message service 502 can be understood as a service for receiving an ordering message and determining whether the commodity is in hot sale, the storage service 503 can be understood as a service for storing a sales volume of the commodity, the cache service 504 is a service for storing hot sale information of a hot sale commodity, the live channel service 505 can be understood as a service for displaying an recommendation card and a commodity list in the live channel; and the message service 502 obtains an on-shelf time of the commodity through the commodity selection service, and obtains an accumulated sales volume of the commodity from the storage service 503, then determines whether the commodity is a hot sale commodity, and in case that the commodity is the hot sale commodity, generates hot sale information corresponding to the commodity, the cache service 504 stores the hot sale information generated by the message service 502, and the live channel service 505 obtains the hot sale information from the cache service 504 and displays the hot sale information. After the live channel service 505 displays the hot sale information, in case that the sales volume of the commodity is updated in the message service 502, the updated sales volume is directly sent to the live channel service 505 for display, and is sent to the storage service 503 for storage.

The information display method provided in some embodiments of the present disclosure is applicable to a live channel in which a commodity being recommended is present, the commodity being recommended can be displayed on a live page as first multimedia information, i.e., the commodity being recommended can be displayed on a live page in a form of an explication card, then hot sale information of the commodity is obtained, which comprises a hot sale identification and a real-time accumulated sales volume of the commodity in the live channel, and the hot sale identification and the real-time accumulated sales volume of the commodity can be displayed in an area which is associated with the first multimedia information of the commodity being recommended, to facilitate a user to timely determine the hot sale condition of the commodity when viewing the first multimedia information of the commodity, so that user experience is improved.

Figure 6:
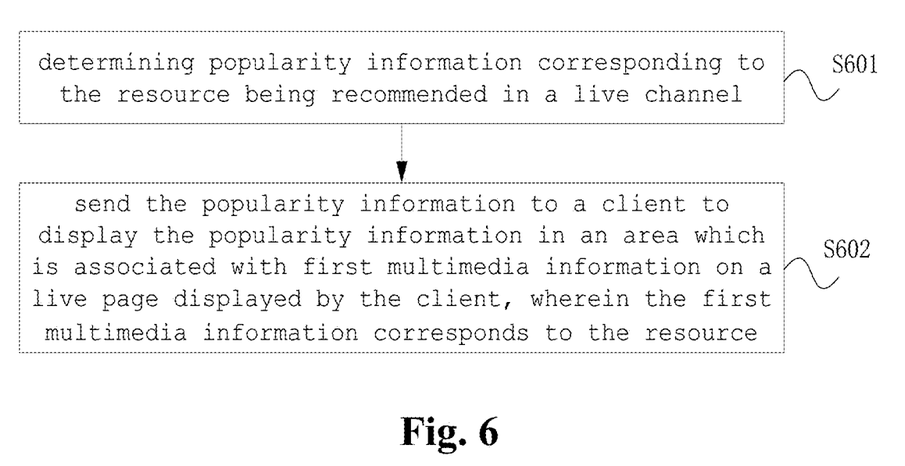
FIG. 6 is a flow diagram of another information display method in some embodiments of the present disclosure.

On the basis of the above embodiments, FIG. 6 is another information display method provided in some embodiments of the present disclosure; the method can be specifically performed by a server that specifically refers to the server 20 connected with the above terminal 21, and the method specifically comprises the following steps S601 to S603 shown in FIG. 6.

Understandably, before the terminal 21 obtains hot sale information of a commodity, the server 20 needs to determine whether the commodity is a hot sale commodity in the live channel, and in case that the commodity is the hot sale commodity, the hot sale information of the commodity is calculated; and in case that the commodity is not the hot sale commodity, only a sales volume of the commodity is counted, to facilitate quick determination of the sales volume of the commodity after the commodity reaches a condition for a hot sale commodity later to generate the hot sale information, so that a time for generating the hot sale information is reduced.

Understandably, the terminal 21 can obtain the hot sale information of the commodity from the server 20 through an interface of multimedia information; specifically, in case that an recommendation card is directly displayed on a live page, the terminal 21 can call an recommendation card interface in the server 20 to query whether the commodity has the hot sale information, in case that it has the hot sale information, the server 20 packages the hot sale information in the recommendation card interface, and the terminal 21 obtains the hot sale information packaged in the recommendation card interface and displays the hot sale information on the live page, for example, as shown in the schematic diagram of the live page in FIG. 3. In case that a commodity list is displayed on the live page, the terminal 21 can call a commodity list interface in the server 20 to query whether the commodity has the hot sale information, in case that it has the hot sale information, the hot sale information is packaged in the commodity list interface, and the hot sale information is returned to the terminal 21, and the terminal 21 displays the hot sale information on the live page, for example, as shown in the schematic diagram of the live page in FIG. 4. In other words, in case that the form of displaying the multimedia information in the live channel is different, then the corresponding interface for obtaining the hot sale information is different, that is, for the first multimedia information 31 and the second multimedia information 32, the interface for obtaining the hot sale information is different.

Understandably, taking the user page 33 shown in FIG. 3 as an example, in case that the user stays in the live channel, that is, the user has viewed live selling in the live channel for a long time, in case that the commodity being recommended is a hot sale commodity and the sales volume of the commodity changes, the server 20 will send a sales volume change message to the terminal 21 by means of a long connection, and the terminal 21 will dynamically change hot sale animation 34 (hot sale information) above the recommendation card, and the hot sale information can be displayed dynamically.

Understandably, taking the user page 45 shown in FIG. 4 as an example, in case that the user stays on the commodity list page, in case that the commodity being recommended is a hot sale commodity and the sales volume of the commodity changes, the server 20 sends the sales volume of the hot sale commodity to the terminal 21 by means of a long connection, and the terminal 21 updates the hot sale information 45 in the commodity list.

S601, determine popularity information corresponding to the resource being recommended in a live channel.

In some embodiments, the above S601 specifically comprises: obtaining attribute information of the resource; and determining the popularity information corresponding to the resource according to the attribute information of the resource.

Understandably, the server 20 can obtain the attribute information of the resource, wherein the attribute information can be quantity information and time information of the resource, and then determine the popularity information corresponding to the resource according to the attribute information of the resource.

In some embodiments, the above S601 specifically further comprises: obtaining a transfer volume and a promotion time of the resource in the live channel; and determining the popularity information corresponding to the resource according to the transfer volume and the promotion time.

Understandably, the server 20 obtains the transfer volume and the promotion time of the resource in the live channel, wherein the transfer volume refers to the sales volume of the commodity in the live channel, the promotion time can be understood as an on-shelf time of the commodity in the live channel, and the on-shelf time is also a sale time, that is, the server 20 obtains the sales volume of the commodity in the live channel and the on-shelf time in the live channel, wherein the sales volume of the commodity in the live channel refers to an accumulated sales volume of the commodity since it was first put on shelf for sale in the live channel, and the on-shelf time refers to a first sale time of the commodity in the live channel.

In some embodiments, the determining the popularity information corresponding to the resource according to the transfer volume and the promotion time specifically comprises: determining whether the resource is a popularity resource according to the transfer volume and the promotion time; in case that the resource is the popularity resource, determining a popularity identification which corresponds to the resource; and determining the popularity information corresponding to the resource according to the popularity identification and the transfer volume.

In some embodiments, the determining whether the resource is the popularity resource according to the transfer volume and the promotion time comprises: in case that the transfer volume is greater than a first preset threshold, determining that the resource is the popularity resource; or determining a transfer efficiency of the resource according to the transfer volume and the promotion time; and in case that the transfer volume is greater than a second preset threshold and the transfer efficiency is greater than or equal to a third preset threshold, determining that the resource is the popularity resource.

Understandably, in case that the obtained accumulated sales volume (transfer volume) of the commodity is greater than the first preset threshold, it can be directly determined that the commodity is a hot sale commodity, and at this time, the on-shelf time (promotion time) of the commodity can not be counted. Or, in case that the accumulated sales volume of the commodity is less than the first preset threshold and greater than the second preset threshold, a quotient between the accumulated sales volume of the commodity and the on-shelf time is calculated, that is, the transfer efficiency of the commodity can be obtained by dividing the accumulated sales volume by the on-shelf time, wherein the on-shelf time can specifically be from the time of the first sale of the commodity in the live channel to a time of this sale of the commodity, for example, the on-shelf time of the commodity can be 48 hours, that is, a time from this live sale of the commodity to the first sale of the commodity is 48 hours; the accumulated sales volume refers to a total sales volume of the commodity since it was put on shelf, that is, the total sales volume within the 48 hours, and a unit of the transfer efficiency can be pieces/minute, i.e. a sales volume per minute; in case that the sales volume of the commodity is greater than the second preset threshold and less than the first preset threshold and the transfer efficiency is greater than or equal to the third preset threshold, it is determined that the commodity is a hot sale commodity; and in case that the sales volume of the commodity is less than the second preset threshold and/or a sales volume flow rate is less than the third preset threshold, it is indicated that the commodity is not a hot sale commodity. The first preset threshold, the second preset threshold, and the third preset threshold can be customized according to user requirements.

Understandably, in case that it is determined that the commodity is the hot sale commodity in the live channel according to the above sales volume and on-shelf time of the commodity, a hot sale identification corresponding to the commodity is determined, a plurality of hot sale identifications can be preset, and then the hot sale identification can be determined according to a type of the commodity. And then the hot sale information corresponding to the commodity can be determined according to the determined hot sale identification and the sales volume of the commodity.

S602, send the popularity information to a client to display the popularity information in an area which is associated with first multimedia information on a live page displayed by the client, wherein the first multimedia information corresponds to the resource.

Understandably, on the basis of the above S601, after determining the hot sale information of the commodity, the server 20 sends the hot sale information to the terminal 21, and the terminal 21 displays the hot sale information in the area which is associated with the first multimedia information on the live page; specifically as shown in the user page 33 in FIG. 3 and the user page 45 in FIG. 4, the first multimedia information is multimedia information which corresponds to the commodity, i.e., information related to the commodity, for example, a display picture and introduction of the commodity.

In some embodiments, after the determining the popularity information corresponding to the resource, the information display method further comprises: loading the popularity information into a memory.

Understandably, after determining the hot sale information of the commodity, the server 20 can load the hot sale information into the running memory, to facilitate the terminal 21 to subsequently obtain the hot sale information of the commodity directly from the running memory of the server 20 through an interface, which improves the efficiency of querying the hot sale information of the commodity by the user terminal 21, at the same time reduces operating pressure of the user terminal 21, and can save part of service resources.

In some embodiments, after the hot sale information is loaded into the memory, the hot sale information in the memory can be sent to the client.

According to the another information display method provided in some embodiments of the present disclosure, the server determines the hot sale information of the commodity being recommended in the live channel, and sends the hot sale information to the terminal, and then the terminal will display the hot sale information in an area on a live page associated with first multimedia information, which facilitates the user viewing the live to accurately determine the hot sale condition of the commodity in real time, and has good user experience.

Figure 7:
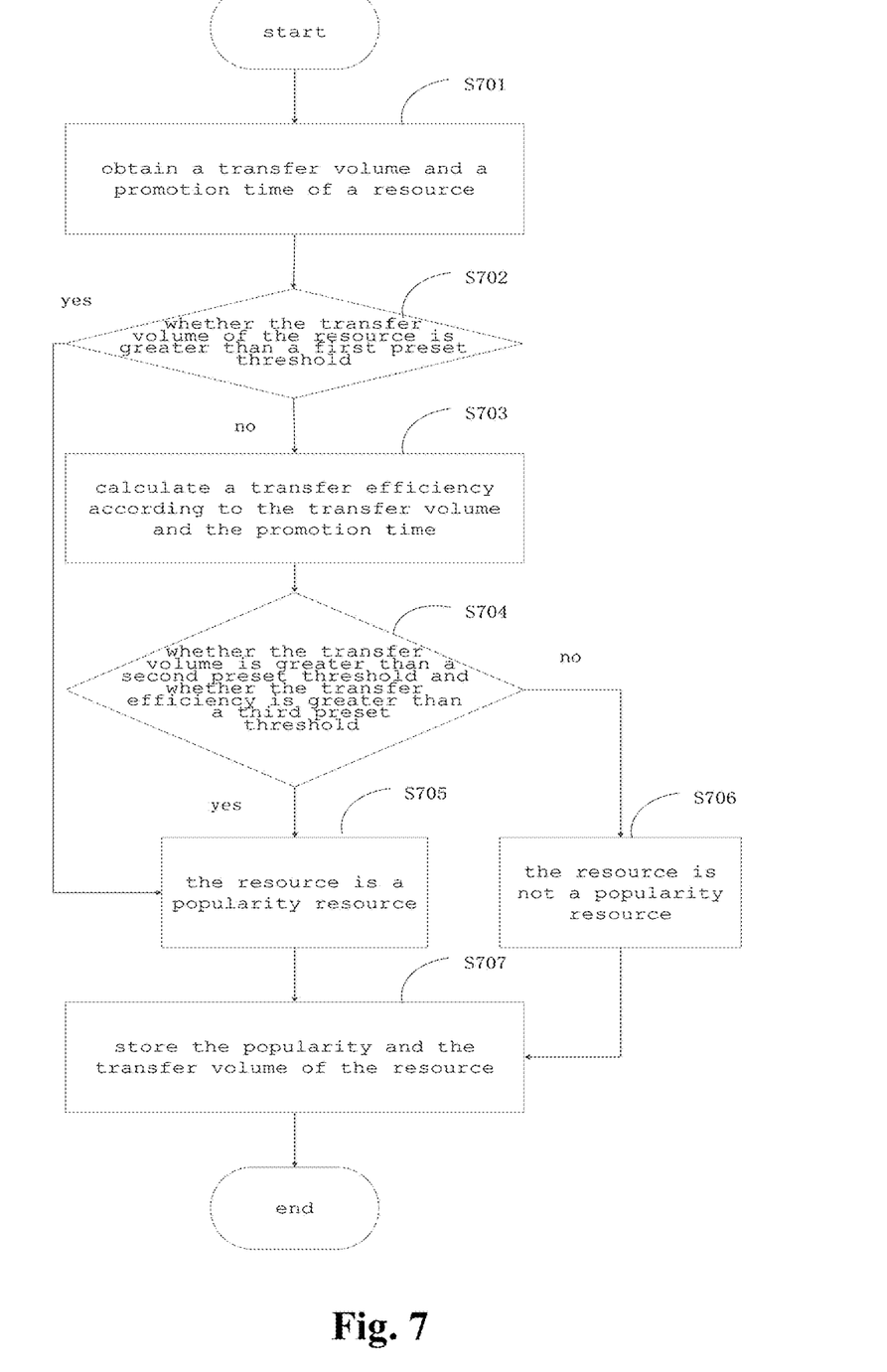
FIG. 7 is a flow diagram of another information display method in some embodiments of the present disclosure.

On the basis of the above embodiments, FIG. 7 is an information display method provided in some embodiments of the present disclosure, which specifically comprises a method of determining whether a commodity being recommended in a live channel is a hot sale commodity, comprising the following steps S701 to S707 shown in FIG. 7.

S701, obtain a transfer volume and a promotion time of a resource.

Understandably, an accumulated sales volume of the commodity in the live channel and a time since a first sale are obtained.

S702, determine whether the transfer volume of the resource is greater than a first preset threshold.

Understandably, on the basis of the above S701, it is determined whether the accumulated sales volume of the commodity is greater than the first preset threshold, in case that it is greater than the first preset threshold, S705 is executed; in case that it is not greater than the first preset threshold, S703 is executed.

S703, calculate a transfer efficiency of the resource according to the transfer volume and the promotion time.

Understandably, on the basis of the above S702 or S701, the S703 can be executed after the S702 is executed, that is, after it is determined that the sales volume is less than the first preset threshold, or the S703 and S702 can be executed synchronously. A quotient between the accumulated sales volume and an on-shelf time is calculated to obtain a sales volume flow rate of the commodity, wherein the sales volume flow rate can be the number of the commodity sold per minute.

S704, determine whether the transfer volume is greater than a second preset threshold and whether the transfer efficiency is greater than a third preset threshold.

Understandably, in case that one of the conditions in the above S702 and S704 is satisfied, then the hot sale condition of the commodity can be determined. On the basis of the above S703, it is determined whether the accumulated sales volume is greater than the second preset threshold and the sales volume flow rate is greater than the third preset threshold, in case that the accumulated sales volume is greater than the second preset threshold and the sales volume flow rate is greater than the third preset threshold, S705 is executed; otherwise, S706 is executed.

S705, the resource is a popularity resource.

Understandably, on the basis of the above S702 or S704, in case that any of the above conditions is satisfied, it is indicated that the commodity is a hot sale commodity in the live channel; the hot sale commodity can be understood as having a relatively high sales volume, or a relatively high purchase volume in a certain period of time.

S706, the resource is not a popularity resource.

Understandably, in case that the condition of the above S702 or S704 is not satisfied, it is indicated that the commodity is not a hot sale commodity, possibly due to a short sale time or low sales volume of the commodity.

S707, store the popularity and the transfer volume of the resource.

Understandably, on the basis of the above S705 and S706, the hot sale condition and the sales volume of the commodity are stored in a memory, for example, in case that the commodity is the hot sale commodity, the hot sale identification and the sales volume are stored, or in case that the commodity is not the hot sale commodity, the sales volume can be directly stored.

Figure 8:
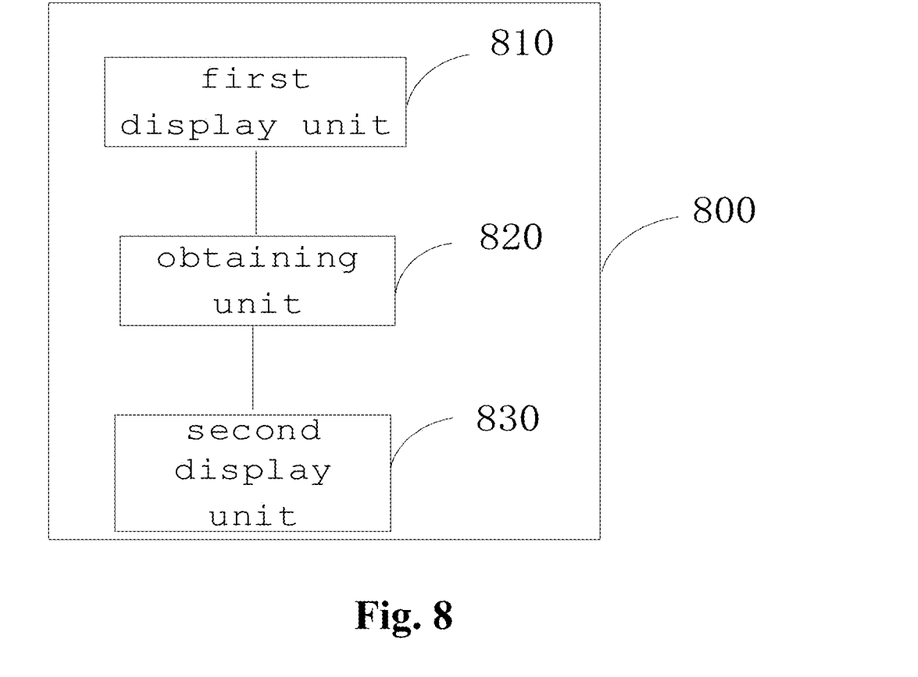
FIG. 8 is a schematic structural diagram of an information display apparatus in some embodiments of the present disclosure.

FIG. 8 is a schematic structural diagram of an information display apparatus in some embodiments of the present disclosure. The information display apparatus provided in some embodiments of the present disclosure can be configured in a client, and the apparatus 800 can be applied to a live channel, wherein the live channel comprises a resource being recommended, the apparatus 800 specifically comprising: a first display unit 810 configured to display a live page, the live page comprising first multimedia information which corresponds to the resource; an obtaining unit configured to obtain popularity information corresponding to the resource; and a second display unit configured to display the popularity information in an area which is associated with the first multimedia information on the live page.

In some embodiments, in the apparatus 800, the popularity information comprises a popularity identification and a transfer volume of the resource.

In some embodiments, in the apparatus 800, the live page further comprises a first identification.

In some embodiments, the apparatus 800 further comprises an updating unit specifically configured to: in response to detecting a trigger operation for the first identification, generate trigger information according to the trigger operation;

send the trigger information to a server so that the server updates the popularity information according to the trigger information; and receive updated popularity information sent from the server, and display the updated popularity information.

In some embodiments, in the apparatus 800, the live page further comprises a second identification.

In some embodiments, the apparatus 800 further comprises a third display unit specifically configured to: in response to detecting a trigger operation for the second identification, display a resource list which is associated with the live channel, second multimedia information which corresponds to the resource at the top of the resource list, and the popularity information in an area which is associated with the second multimedia information.

The information display apparatus provided in some embodiments of the present disclosure can perform the steps performed by the client in the information display method provided in the method embodiments of the present disclosure, and has beneficial effects of performing the steps, which are not repeated here.

Figure 9:
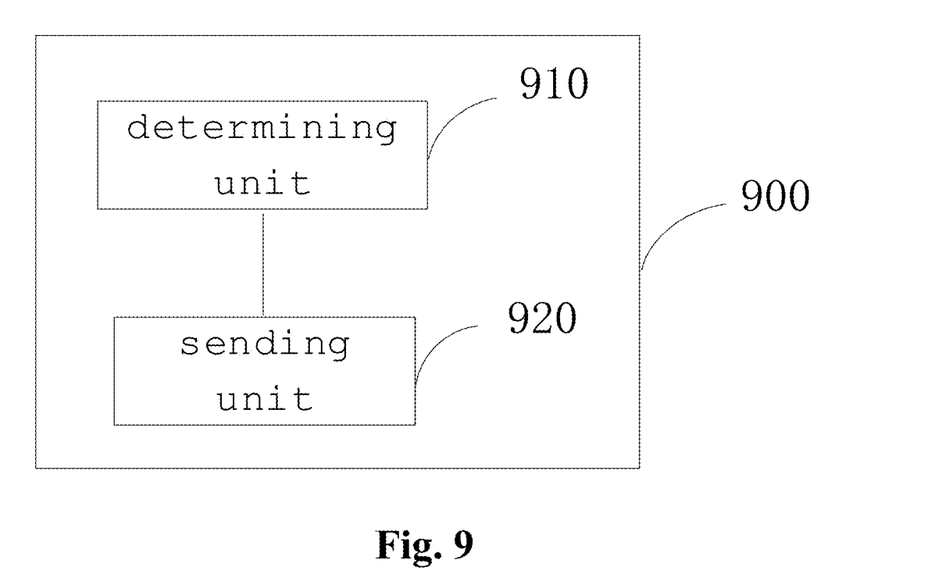
FIG. 9 is a schematic structural diagram of another information display apparatus in some embodiments of the present disclosure.

FIG. 9 is a schematic structural diagram of an information display apparatus in some embodiments of the present disclosure. The information display apparatus provided in some embodiments of the present disclosure can be configured in a server, the apparatus 900 can be applied to a live channel, and the live channel comprises a resource being recommended, the apparatus 900 specifically comprising: a determining unit 910 configured to determine popularity information corresponding to the resource being recommended in a live channel; and a sending unit 920 configured to send the popularity information to a client to display the popularity information in an area which is associated with first multimedia information on a live page displayed by the client, wherein the first multimedia information corresponds to the resource.

In some embodiments, the determining unit 910 is specifically configured to: obtain attribute information of the resource; and determine the popularity information corresponding to the resource according to the attribute information of the resource.

In some embodiments, the determining unit 910 is specifically configured to: obtain a transfer volume and a promotion time of the resource in the live channel; and determine the popularity information corresponding to the resource according to the transfer volume and the promotion time.

In some embodiments, in the determining unit 910, the determining the popularity information corresponding to the resource according to the transfer volume and the promotion time, is specifically configured to: determine whether the resource is a popularity resource according to the transfer volume and the promotion time; in case that the resource is the popularity resource, determine a popularity identification which corresponds to the resource; and determining the popularity information corresponding to the resource according to the popularity identification and the transfer volume.

In some embodiments, the apparatus 900 further comprises a loading unit, after the determining the popularity information corresponding to the resource, specifically configured to: load the popularity information into a memory.

In some embodiments, in the sending unit 920, the sending the popularity information to the client, is specifically configured to: send the popularity information in the memory to the client.

The information display apparatus provided in some embodiments of the present disclosure can perform the steps performed by the server in the information display method provided in the method embodiments of the present disclosure, and has beneficial effects of performing the steps, which are not repeated here.

Figure 10:
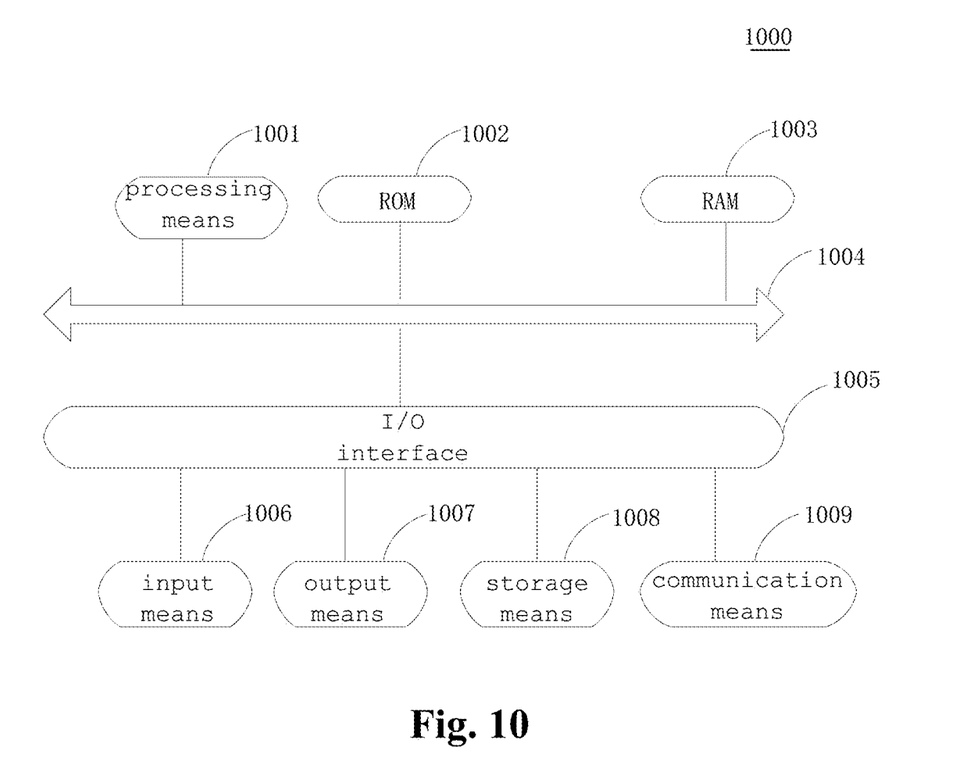
FIG. 10 is a schematic structural diagram of an electronic device in some embodiments of the present disclosure.

FIG. 10 is a schematic structural diagram of an electronic device in some embodiments of the present disclosure. Reference is specifically made below to FIG. 10, which is a schematic structural diagram of an electronic device 1000 suitable for implementing some embodiments of the present disclosure. The electronic device 1000 in some embodiments of the present disclosure can include, but is not limited to, a mobile terminal such as a mobile phone, a notebook computer, a digital broadcast receiver, a PDA (Personal Digital Assistant), a PAD (tablet computer), a PMP (Portable Multimedia Player), a vehicle-mounted terminal (e.g., a vehicle-mounted navigation terminal), and a wearable electronic device, and a fixed terminal such as a digital TV, a desktop computer, and a smart home device. The electronic device shown in FIG. 10 is only an example, and should not bring any limitation to the functions and the scope of use of the embodiments of the present disclosure.

As shown in FIG. 10, the electronic device 1000 can comprise a processing means (e.g., a central processing unit, a graphics processing unit, etc.) 1001 which can perform various appropriate actions and processes according to a program stored in a read-only memory (ROM) 1002 or a program loaded from a storage means 1008 into a random access memory (RAM) 1003 to implement the information display method according to the embodiments of the present disclosure. In the RAM 1003, various programs and data necessary for the operation of the electronic device 1000 are also stored. The processing means 1001, ROM 1002, and RAM 1003 are connected to each other by a bus 1004. An input/output (I/O) interface 1005 is also connected to the bus 1004.

Generally, the following means can be connected to the I/O interface 1005: an input means 1006 comprising, for example, a touch screen, touch pad, keyboard, mouse, camera, microphone, accelerometer, gyroscope, etc.; an output means 1007 comprising, for example, a liquid crystal display (LCD), speaker, vibrator, etc.; the storage means 1008 comprising, for example, a magnetic tape, hard disk, etc.; and a communication means 1009. The communication means 1009 can allow the electronic device 1000 to communicate wirelessly or by wire with other devices to exchange data. While FIG. 10 illustrates the electronic device 1000 having various means, it should be understood that not all illustrated means are required to be implemented or provided. More or fewer means can be alternatively implemented or provided.

In some embodiments, according to the embodiments of the present disclosure, the processes described above with reference to the flow diagrams can be implemented as a computer software program. For example, some embodiments of the present disclosure comprise a computer program product, the computer program product comprising a computer program carried on a non-transitory computer-readable medium, the computer program containing program code for performing the method illustrated by the flow diagrams, thereby implementing the information display method as described above. In such embodiments, the computer program can be downloaded and installed from a network through the communication means 1009, or installed from the storage means 1008, or installed from the ROM 1002. The computer program, when executed by the processing means 1001, performs the above functions defined in the method of the embodiments of the present disclosure.

It should be noted that the above computer-readable medium of the present disclosure can be a computer-readable signal medium or a computer-readable storage medium or any combination of the above two. The computer-readable storage medium can be, for example, but is not limited to, an electronic, magnetic, optical, electromagnetic, infrared, or semiconductor system, apparatus, or device, or any combination of the foregoing. More specific examples of the computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium can be any tangible medium containing or storing a program, wherein the program can be used by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take a variety of forms, comprising, but not limited to, an electromagnetic signal, optical signal, or any suitable combination of the forgoing. The computer-readable signal medium can also be any computer-readable medium other than the computer-readable storage medium, wherein the computer-readable signal medium can send, propagate, or transmit a program for use by or in conjunction with an instruction execution system, apparatus, or device. The program code contained in the computer-readable medium can be transmitted using any appropriate medium, comprising but not limited to: a wire, an optical cable, RF (Radio Frequency), etc., or any suitable combination of the foregoing.

In some implementations, a client and a server can communicate using any currently known or future developed network protocol, such as HTTP (HyperText Transfer Protocol), and can be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium can be contained in the above electronic device; or can exist separately without being assembled into the electronic device.

The above computer-readable medium has one or more programs carried thereon, which, when executed by the electronic device, cause the electronic device to: display a live page, the live page comprising first multimedia information which corresponds to the resource; obtain popularity information corresponding to the resource; and display the popularity information in an area which is associated with the first multimedia information on the live page.

Optionally, when the above one or more programs are executed by the electronic device, the electronic device can also perform other steps according to the above embodiment.

Computer program code for performing the operation of the present disclosure can be written in one or more programming languages or a combination thereof, wherein the above programming language comprises but is not limited to an object-oriented programming language such as Java, Smalltalk, and C++, and also comprises a conventional procedural programming language, such as a "C" language or a similar programming language. The program code can be executed entirely on a user's computer, partly on the user's computer, as a stand-alone software package, partly on the user's computer and partly on a remote computer, or entirely on the remote computer or server. In a scenario where the remote computer is involved, the remote computer can be connected to the user's computer through any type of network, comprising a local area network (LAN) or a wide area network (WAN), or can be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams can represent a module, program segment, or part of code, which comprises one or more executable instructions for implementing a specified logical function. It should also be noted that, in some alternative implementations, functions noted in blocks can occur in a different order from those noted in the drawings. For example, two blocks shown in succession can, in fact, be executed substantially concurrently, or they can sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in some embodiments of the present disclosure can be implemented by software or hardware. The name of the unit does not, in some cases, constitute a limitation on the unit itself.

The functions described above herein can be performed, at least partially, by one or more hardware logic components. For example, without limitation, a hardware logic component of an exemplary type that can be used comprises: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium can be a tangible medium, which can contain or store a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided an information display method, comprising: displaying a live page, the live page comprising first multimedia information which corresponds to the resource; obtaining popularity information corresponding to the resource; and displaying the popularity information in an area which is associated with the first multimedia information on the live page.

According to one or more embodiments of the present disclosure, there is provided another information display method, comprising: determining popularity information corresponding to a resource being recommended in a live channel, wherein the popularity information corresponding to the resource is determined according to a transfer volume and a promotion time of the resource in the live channel; and sending the popularity information to a client to display the popularity information in an area which is associated with first multimedia information on a live page displayed by the client, wherein the first multimedia information corresponds to the resource.

According to one or more embodiments of the present disclosure, there is provided an information display apparatus, comprising: a first display unit configured to display a live page, the live page comprising first multimedia information which corresponds to the resource; an obtaining unit configured to obtain popularity information corresponding to the resource; and a second display unit configured to display the popularity information in an area which is associated with the first multimedia information on the live page.

According to one or more embodiments of the present disclosure, there is provided another information display apparatus, comprising: a determining unit configured to determine popularity information corresponding to the resource being recommended in a live channel; and a sending unit configured to send the popularity information to a client to display the popularity information in an area which is associated with first multimedia information on a live page displayed by the client, wherein the first multimedia information corresponds to the resource.

The units described above can be implemented as software components executed on one or more general-purpose processors, or as hardware executing certain functions or combinations thereof, such as a programmable logic device and/or application specific integrated circuit. In some embodiments, these units can be embodied in a form of a software product, which can be stored in non-volatile storage media comprising instructions that cause a computer device (e.g., a personal computer, server, network device, mobile terminal, etc.) to implement the method described in some embodiments of the present disclosure. In other embodiments, the above units can also be implemented on a single device or can be distributed on a plurality of devices. Functions of these units can be combined with each other, or further divided into a plurality of sub-units.

According to one or more embodiments of the present disclosure, there is provided an electronic device, comprising:

one or more processors; and a memory configured to store one or more programs, the one or more programs, when executed by the one or more processors, causing the one or more processors to implement any of the information display methods provided in the present disclosure.

According to one or more embodiments of the present disclosure, there is provided a computer-readable storage medium having thereon stored a computer program which, when executed by a processor, implementing any of the information display methods provided in the present disclosure.

Some embodiments of the present disclosure further provide a computer program product comprising a computer program or instructions which, when executed by a processor, implement the information display method as described above.

The foregoing description is only the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are comprised in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

The invention claimed is:

1. An information display method, comprising:
    displaying a live page, wherein the live page comprises first multimedia information corresponding to a resource being recommended in a live channel and a second identification;
    obtaining popularity information corresponding to the resource; displaying the popularity information in an area which is associated with the first multimedia information on the live page; and
    in response to a client detecting a trigger operation for the second identification, displaying a resource list which is associated with the live channel, second multimedia information which corresponds to the resource at the top of the resource list, and the popularity information in an area which is associated with the second multimedia information, wherein the area which is associated with the second multimedia information is a periphery of a display area of the second multimedia information.

2. The information display method according to claim 1, wherein the popularity information comprises a popularity identification and a transfer volume of the resource.

3. The information display method according to claim 1, wherein the live page further comprises a first identification, and the information display method further comprises:
    in response to detecting a trigger operation for the first identification, generating trigger information according to the trigger operation;
    sending the trigger information to a server, so that the server updates the popularity information according to the trigger information; and
    receiving updated popularity information sent from the server, and displaying the updated popularity information.

4. The information display method according to claim 1, wherein the popularity information corresponding to the resource is determined according to attribute information of the resource.

5. The information display method according to claim 1, wherein the popularity information of the resource is determined according to a transfer volume and a promotion time of the resource in the live channel.

6. The information display method according to claim 5, wherein the popularity information corresponding to the resource is determined according to the popularity identification which corresponds to the resource and the transfer volume of the resource in the live channel, the popularity identification which corresponds to the resource is determined according to whether the resource is a popularity resource, and whether the resource is a popularity resource is determined according to the transfer volume and the promotion time in the live channel.

7. An information display method, comprising:
determining popularity information corresponding to a resource being recommended in a live channel; and
sending the popularity information to a client to display the popularity information in an area which is associated with first multimedia information on a live page displayed by the client, wherein the first multimedia information corresponds to the resource, wherein the live page comprises a second identification, the client is configured to display a resource list which is associated with the live channel, second multimedia information which corresponds to the resource at the top of the resource list, and the popularity information in an area which is associated with the second multimedia information, in response to the client detecting a trigger operation for the second identification, wherein the area which is associated with the second multimedia information is a periphery of a display area of the second multimedia information.

8. The information display method according to claim 7, wherein the determining the popularity information corresponding to the resource comprises:
obtaining attribute information of the resource; and
determining the popularity information corresponding to the resource according to the attribute information of the resource.

9. The information display method according to claim 7, wherein the determining the popularity information corresponding to the resource comprises:
obtaining a transfer volume and a promotion time of the resource in the live channel; and
determining the popularity information corresponding to the resource according to the transfer volume and the promotion time.

10. The information display method according to claim 9, wherein the determining the popularity information corresponding to the resource according to the transfer volume and the promotion time comprises:
determining whether the resource is a popularity resource according to the transfer volume and the promotion time;
determining a popularity identification which corresponds to the resource, in response to the resource being the popularity resource; and
determining the popularity information corresponding to the resource according to the popularity identification and the transfer volume.

11. The information display method according to claim 10, wherein the determining whether the resource is the popularity resource according to the transfer volume and the promotion time comprises:
determining that the resource is the popularity resource, in response to the transfer volume being greater than a first preset threshold.

12. The information display method according to claim 10, wherein the determining whether the resource is the popularity resource according to the transfer volume and the promotion time comprises:
determining a transfer efficiency of the resource according to the transfer volume and the promotion time; and
determining that the resource is the popularity resource, in response to the transfer volume being greater than a second preset threshold and the transfer efficiency being greater than or equal to a third preset threshold.

13. The information display method according to claim 7, further comprising:
after determining the popularity information corresponding to the resource, loading the popularity information into a memory; and
the sending the popularity information to the client comprising:
sending the popularity information in the memory to the client.

14. An electronic device, comprising:
one or more processors; and
a storage means configured to store one or more programs,
the one or more programs, when executed by the one or more processors, causing the one or more processors to implement the information display method according to claim 1.

15. A non-transitory computer-readable storage medium having thereon stored a computer program which, when executed by a processor, implements the information display method comprising:
displaying a live page, wherein the live page comprises first multimedia information corresponding to a resource being recommended in a live channel and a second identification;
obtaining popularity information corresponding to the resource;
displaying the popularity information in an area which is associated with the first multimedia information on the live page; and
in response to a client detecting a trigger operation for the second identification, displaying a resource list which is associated with the live channel, second multimedia information which corresponds to the resource at the top of the resource list, and the popularity information in an area which is associated with the second multimedia information, wherein the area which is associated with the second multimedia information is a periphery of a display area of the second multimedia information.

16. The non-transitory computer-readable storage medium according to claim 15, wherein the popularity information comprises a popularity identification and a transfer volume of the resource.

17. The non-transitory computer-readable storage medium according to claim 15, wherein the live page further comprises a first identification, and the information display method further comprises:

in response to detecting a trigger operation for the first identification, generating trigger information according to the trigger operation;

sending the trigger information to a server, so that the server updates the popularity information according to the trigger information; and receiving updated popularity information sent from the server, and displaying the updated popularity information.

18. The non-transitory computer-readable storage medium according to claim 15, wherein the popularity information corresponding to the resource is determined according to attribute information of the resource.

\* \* \* \* \*